US008606519B2

(12) United States Patent
Waeller

(10) Patent No.: US 8,606,519 B2
(45) Date of Patent: Dec. 10, 2013

(54) NAVIGATION SYSTEM, PARTICULARLY FOR A MOTOR VEHICLE

(75) Inventor: Christoph Waeller, Braunschweig (DE)

(73) Assignees: Audi AG, Ingolstadt (DE); Volkswagen AG, Wolfsburg (DE)

(*) Notice: Subject to any disclaimer, the term of this patent is extended or adjusted under 35 U.S.C. 154(b) by 0 days.

(21) Appl. No.: 13/380,306

(22) PCT Filed: May 8, 2010

(86) PCT No.: PCT/EP2010/002818
§ 371 (c)(1),
(2), (4) Date: Dec. 22, 2011

(87) PCT Pub. No.: WO2010/149247
PCT Pub. Date: Dec. 29, 2010

(65) Prior Publication Data
US 2012/0109525 A1 May 3, 2012

(30) Foreign Application Priority Data
Jun. 27, 2009 (DE) .......................... 10 2009 030 791

(51) Int. Cl.
*G01C 21/00* (2006.01)
(52) U.S. Cl.
USPC ......................................... 701/533; 345/173
(58) Field of Classification Search
USPC ......................................... 701/533; 345/173
See application file for complete search history.

(56) References Cited

U.S. PATENT DOCUMENTS

2004/0254719 A1    12/2004  Tanaka et al.
2008/0042978 A1*   2/2008   Perez-Noguera ............. 345/168
2009/0005981 A1    1/2009   Forstall et al.
2009/0192703 A1*   7/2009   Hess et al. .................... 701/200
2012/0032899 A1*   2/2012   Waeller et al. ................ 345/173

FOREIGN PATENT DOCUMENTS

DE    197 53 742       6/1999
DE    10 2004 029 203  12/2005
DE    10 2006 037 154  10/2007

(Continued)

OTHER PUBLICATIONS

International Search Report for PCT/EP2010/002818, mailed on Jul. 23, 2010.

(Continued)

*Primary Examiner* — Mary Cheung
*Assistant Examiner* — Yuen Wong
(74) *Attorney, Agent, or Firm* — Staas & Halsey LLP

(57) ABSTRACT

A navigation system, particularly for a motor vehicle, determines the position of the navigation system or the motor vehicle and for determining a route to a destination. The navigation system includes a display for presenting variable information and a transparent touchscreen arranged above the display or a touchpad arranged independently of the display for recognizing the position of a touch on the touchscreen or the touchpad. The navigation system also includes a controller for displaying a map presentation on the display as a first operator control area and for displaying at least one second operator control area on the display. A contact-based dragging movement using the touchscreen over the first operator control area allows movement of the map presentation, rotation of the map presentation or inclination of the map presentation to be executed. A contact-based dragging movement using the touchscreen over the second operator control area allows movement of the map presentation, rotation of the map presentation and inclination of the map presentation to be executed.

19 Claims, 3 Drawing Sheets

(56) References Cited

FOREIGN PATENT DOCUMENTS

| | | |
|---|---|---|
| DE | 10 2007 014 485 | 11/2007 |
| DE | 2 063 226 | 5/2009 |
| DE | 102009030791.5 | 6/2009 |
| JP | 2000-163031 | 6/2000 |
| WO | PCT/EP2010/002818 | 5/2010 |

OTHER PUBLICATIONS

German Search Report for Priority Application No. 10 2009 030 791.5, issued on Mar. 18, 2011.

International Preliminary Report on Patentability for PCT/EP2010/002818, mailed on Jan. 26, 2012 (8 pages).

* cited by examiner

NAVIGATION SYSTEM, PARTICULARLY FOR A MOTOR VEHICLE

CROSS REFERENCE TO RELATED APPLICATIONS

This application is based on and hereby claims priority to International Application No. PCT/EP2010/002818 filed on May 8, 2010 and German Application No. 10 2009 030 791.5 filed on Jun. 27, 2009, the contents of which are hereby incorporated by reference.

BACKGROUND

A navigation system can be used, particularly for a motor vehicle, for determining the position of the navigation system or the motor vehicle and for determining a route to a destination.

DE 41 21 180 A1 discloses a method for manually controlling an electronic display apparatus which comprises a screen and operator control elements and also an evaluation circuit, wherein the evaluation circuit is used to convey two distance zones and the approach of a hand of a user prompts the use of said distance zones to initiate operator control functions.

US 2007/0109323 A1 discloses a map display system having a touchpanel and a display, wherein a windowframe for a map display and also a module for recognizing contact with an indication element on the windowframe are provided. In this case, the size of the window is altered to match the size of a movement by the indication element.

WO 2008/015504 A2 discloses a display and a display controller for presenting a window and an image in the window, wherein the window comprises a scrollbar for altering the horizontal or vertical position of the window relative to the image in the window.

DE 602 20 933 T2 discloses a method for distinguishing between two or more chronologically overlapping touch statements in a touchscreen system.

US 2006/0161871 A1 discloses an input/output platform which has an input/output interface having one or more input/output devices. Furthermore, an approach system for recognizing whether a finger is in the close surroundings of the input/output interface without touching it is provided.

EP 1 517 228 A2 discloses a method for gesture recognition, wherein an image is presented on a contact surface, wherein a touch on this contact surface is detected and it is ascertained whether multiple touches correspond to a gesture, wherein the presented image is altered if a particular gesture is recognized.

SUMMARY

It is one possible object to specify an improved navigation system, particularly an improved navigation system for a motor vehicle. In particular, it is desirable to speed up the operator control of a navigation system for a motor vehicle so that the necessary visual contact on a display in the navigation system is as little as possible.

The aforementioned object is achieved by a navigation system, particularly for a motor vehicle, for determining the position of the navigation system or the motor vehicle and for determining a route to a destination, wherein the navigation system comprises a display or a display device for presenting variable information and a transparent touchscreen arranged above the display or a touchpad arranged independently of the display or of the display device for recognizing the position of a touch on the touchscreen, wherein the navigation system comprises a controller for displaying a map presentation on the display as a first operator control area and for displaying at least one second operator control area on the display, wherein a contact-based dragging movement using the touchscreen over the first operator control area allows a function from the group comprising
- movement of the map presentation,
- rotation of the map presentation and
- inclination of the map presentation to be executed, and wherein a contact-based dragging movement using the touchscreen or the touchpad over the second operator control area allows a different function from the group comprising
- movement of the map presentation,
- rotation of the map presentation and
- inclination of the map presentation to be executed.

A map presentation within the context of this discussion may be a map, a satellite picture or a 3D graphic. The map, the satellite picture or the 3D graphic can in this case be presented in plan view, in birds eye perspective or in a first person view.

A display or a display device within the context of this discussion, is in particular, a display having independently actuatable pixels. The display may be a matrix display such as a TFT.

The touchpad arranged independently of the display is in a form such that the co-ordinates of the touchpad are coordinated with the co-ordinates of the display or of the display device, that is to say that a touch on the touchpad or an operator control gesture can be associated with defined co-ordinates on the display.

In one advantageous refinement, the controller can be used to present a third operator control area on the display, wherein a contact-based dragging movement using the touchscreen or the touchpad over the third operator control area allows the remaining function from the group comprising
- movement of the map presentation,
- rotation of the map presentation and
- inclination of the map presentation to be executed. In an additionally advantageous refinement, the second operator control area and the third operator control area form a frame surrounding the first operator control area. In an additionally advantageous refinement, the second operator control area is associated with the lower portion of the frame and/or with the upper portion of the frame. In an additionally advantageous refinement, the third operator control area is associated with the left-hand portion of the frame and/or with the right-hand portion of the frame.

In an additionally advantageous refinement, the second operator control area is oriented horizontally. In an additionally advantageous refinement, the third operator control area is oriented vertically.

In an additionally advantageous refinement, the map presentation can be moved upon a contact-based dragging movement using the touchscreen or the touchpad over the first operator control area. In an additionally advantageous refinement, the map presentation can be rotated upon a contact-based dragging movement using the touchscreen or the touchpad over the second operator control area. In an additionally advantageous refinement, the map presentation can be inclined upon a contact-based dragging movement using the touchscreen or the touchpad over the third operator control area.

In an additionally advantageous refinement, the touchscreen is designed as a multitouchscreen or the touchpad is designed as a multitouchpad, wherein a contact-based compressing or spreading movement using the multitouchscreen or the multitouchpad over the first operator control area allows a function from the group comprising reduction or enlargement of the map presentation and
inclination of the map presentation to be executed, and wherein a contact-based compressing or spreading movement using the multitouchscreen over the second operator control area and/or over the third operator control area allows the other function from the group comprising reduction or enlargement of the map presentation and
inclination of the map presentation to be executed.

The multitouchscreen or multitouchpad may be a touchscreen or a touchpad which can be used to distinguish at least two simultaneously occurring touches on the touchscreen or the touchpad from one another, wherein the position of the first touch and the position of the at least second touch can be determined independently of one another.

The multitouchscreen or multitouchpad may have touch-sensitive or pressure-sensitive areas which are arranged in pixel or grating form.

A compressing movement within the context of this discussion is, in particular, a movement in which two touch positions need to move toward one another. A spreading movement within the context of this discussion is, in particular, a movement of two contact positions apart. By way of example, a compressing movement within the context of the invention can be achieved by the movement toward one another of two fingertips which are touching the multitouchscreen or the multitouchpad. A spreading movement can be achieved, in particular, by two fingertips which are touching the multitouchscreen or the multitouchpad when said fingertips move away from one another.

The aforementioned object is—particularly in connection with the aforementioned features—also achieved by a navigation system, particularly for a motor vehicle, for determining the position of the navigation system or the motor vehicle and for determining a route to a destination, wherein the navigation system comprises a display for presenting variable information and a transparent multitouchscreen arranged above the display for recognizing the positions of at least two simultaneously occurring touches on the multitouchscreen, wherein the navigation system comprises a controller for displaying a map presentation on the display as a first operator control area and for displaying at least one second operator control area on the display, wherein a contact-based compressing or spreading movement using the multitouchscreen or the multitouchpad over the first operator control area allows a function from the group comprising reduction or enlargement of the map presentation and
inclination of the map presentation to be executed, and wherein a contact-based compressing or spreading movement using the multitouchscreen over the second operator control area allows the other function from the group comprising reduction or enlargement of the map presentation and
inclination of the map presentation to be executed.

The aforementioned object is—particularly in connection with the aforementioned features—also achieved by a method for operating a navigation system for determining the position of the navigation system or the motor vehicle and for determining a route to a destination, wherein the navigation system comprises a display for presenting variable information and a transparent touchscreen arranged above the display or a touchpad arranged independently of the display for recognizing the position of a touch on the touchscreen or the touchpad or a transparent multitouchscreen arranged above the display or a multitouchpad arranged independently of the display for recognizing the positions of at least two simultaneously occurring touches on the multitouchscreen or the multitouchpad, wherein the display is used to present a map presentation as a first operator control area and a second operator control area, wherein a contact-based dragging movement using the touchscreen or the multitouchscreen or the touchpad or the multitouchpad over the first operator control area prompts a function from the group comprising movement of the map presentation,
rotation of the map presentation and
inclination of the map presentation to be executed, and wherein a contact-based dragging movement using the touchscreen or the multitouchscreen or the touchpad or the multitouchpad over the second operator control area prompts a different function from the group comprising movement of the map presentation,
rotation of the map presentation and
inclination of the map presentation to be executed.

In one advantageous refinement, the display is used to present a third operator control area, wherein a contact-based dragging movement using the touchscreen or the multitouchscreen or the touchpad or the multitouchpad over the third operator control area prompts the remaining function from the group comprising movement of the map presentation
rotation of the map presentation and
inclination of the map presentation to be executed.

In an additionally advantageous refinement, the touchscreen is designed as a multitouchscreen or the touchpad is designed as a multitouchpad, wherein a contact-based compressing or spreading movement using the multitouchscreen or the multitouchpad over the first operator control area prompts a function from the group comprising reduction or enlargement of the map presentation and
inclination of the map presentation to be executed, and wherein a contact-based compressing or spreading movement using the multitouchscreen or the multitouchpad over the second operator control area and/or over the third operator control area prompts the other function from the group comprising reduction or enlargement of the map presentation and
inclination of the map presentation to be executed.

The motor vehicle may be a land vehicle which can be used individually in road traffic. Motor vehicles are, in particular, not limited to land vehicles with an internal combustion engine.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
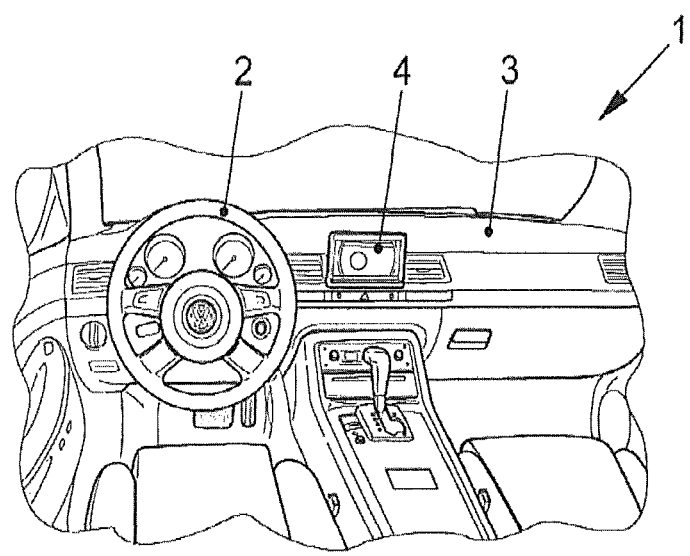
FIG. 1 shows an exemplary embodiment of a detail from an internal view of a motor vehicle.

Reference will now be made in detail to the preferred embodiments of the present invention, examples of which are illustrated in the accompanying drawings, wherein like reference numerals refer to like elements throughout.

Figure 2:
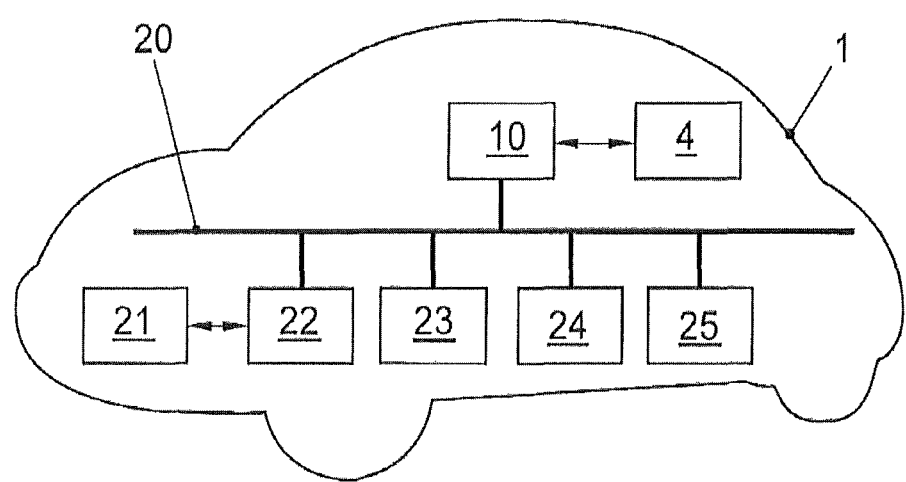
FIG. 2 shows a basic illustration of the motor vehicle shown in FIG. 1.

FIG. 1 shows an exemplary embodiment of a detail from an internal view of a motor vehicle 1, a basic illustration of which is shown in FIG. 2. In this case, the motor vehicle 1 comprises an operator control apparatus 4 arranged next to the steering wheel 2 on the dashboard 3. The operator control apparatus 4 can be used to operate a navigation kernel 23 and also, by way of example, an automatic air-conditioning system 24, an entertainment system 25 and—via a mobile telephone interface 22—a mobile telephone 21. To this end, the operator control apparatus 4 is coupled to a display controller 10 which is connected by a bus system to the telephone interface 22, to the navigation kernel 23, to the automatic air-conditioning system 24 and to the entertainment system 25. In this case, the navigation kernel 23, the display controller 10 and the operator control apparatus 4 form an exemplary embodiment for a navigation system.

Figure 3:
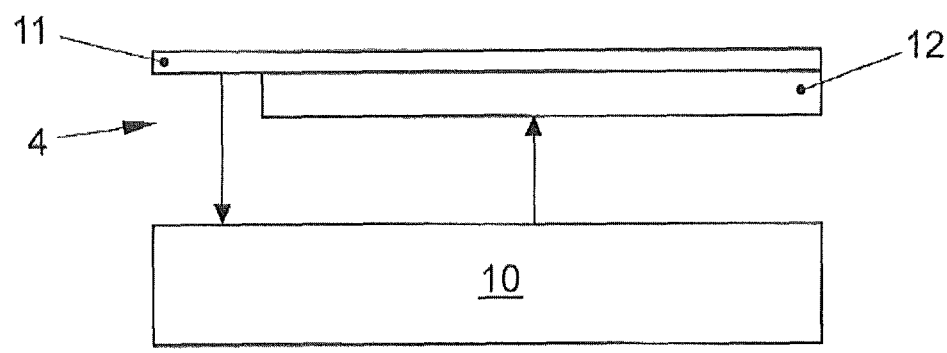
FIG. 3 shows an exemplary embodiment of an operator control apparatus.

The operator control apparatus 4 comprises—as FIG. 3 shows—a display 12 for presenting variable information and a transparent multitouchscreen 11 arranged above the display 12 for recognizing the position of at least two simultaneously occurring touches on the multitouchscreen 11. The multitouchscreen 11 comprises a matrix-like structure of conductive lines/surface areas with columns and rows. By way of example, this structure can be formed of ITO surface areas or fine wires.

Figure 4:
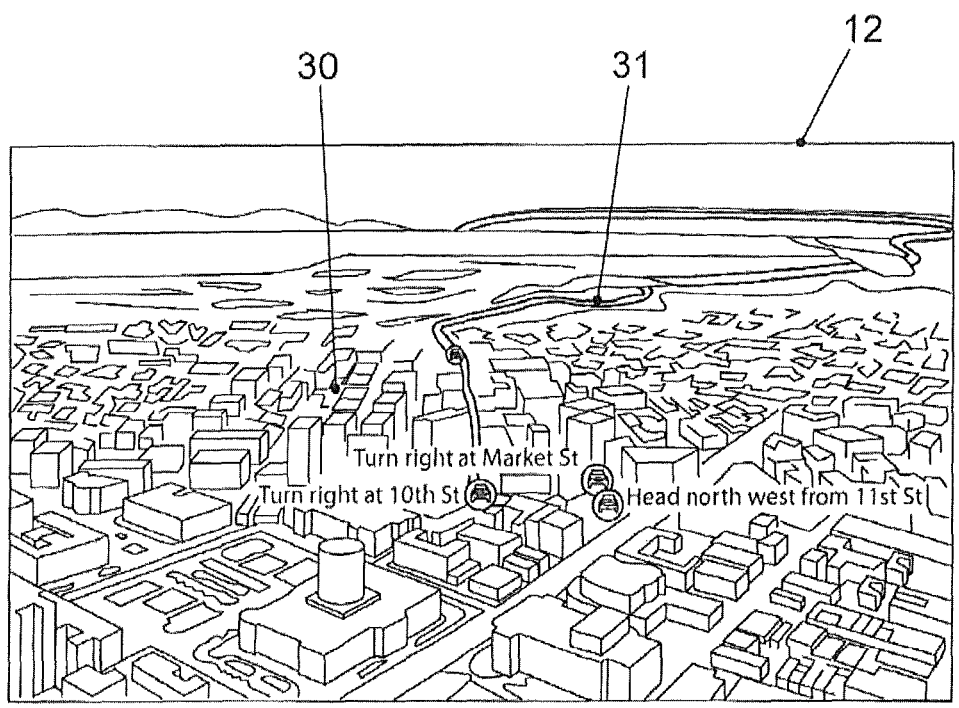
FIG. 4 shows a map presentation presented by the operator control apparatus shown in FIG. 3.

The display 12 of the operator control apparatus 4 can—as FIG. 4 shows—be used to present a map presentation 30 for the navigation kernel 23 or from the navigation kernel 23, in particular in connection with a route 31 from a location of the motor vehicle 1 to a destination. In the exemplary embodiment shown in FIG. 4, the map presentation 30 is a three-dimensional depiction of a landscape in a birds eye perspective representation.

Figure 5:
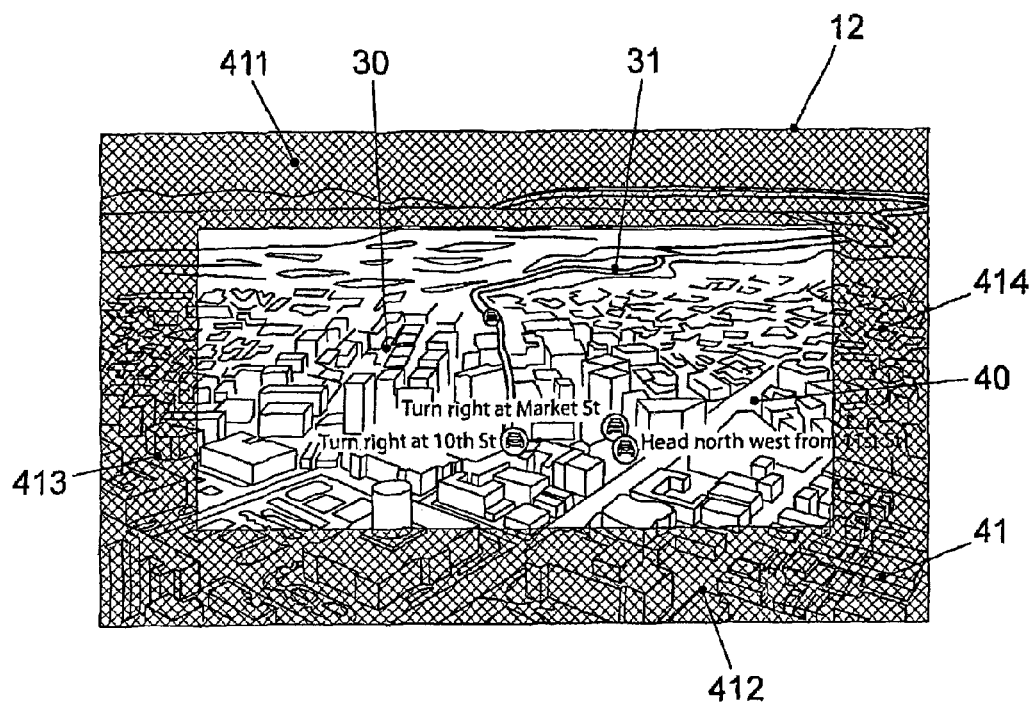
FIG. 5 shows the map presentation shown in FIG. 4 in conjunction with a frame comprising an operator control area.

When the multitouchscreen 11 is touched, the presentation shown in FIG. 4 changes to a presentation as shown in FIG. 5, in which a frame 41 surrounds an inner area 40. The inner area 40 is an exemplary embodiment for a first operator control area. In the inner area 40, the map presentation is retained. Provision may be made for the map presentation also to be retained in the frame 41. In this case, however, provision is advantageously made for the map presentation to be presented and contrasted, for example in dimmed form. The frame 41 comprises an upper portion 411, a lower portion 412, a left-hand portion 413 and a right-hand portion 414. The upper portion 411 and the lower portion 412 of the frame 41 form an exemplary embodiment for a second operator control area. The left-hand portion 413 and the right-hand portion 414 of the frame 41 form an exemplary embodiment for a third operator control area.

Figure 6:
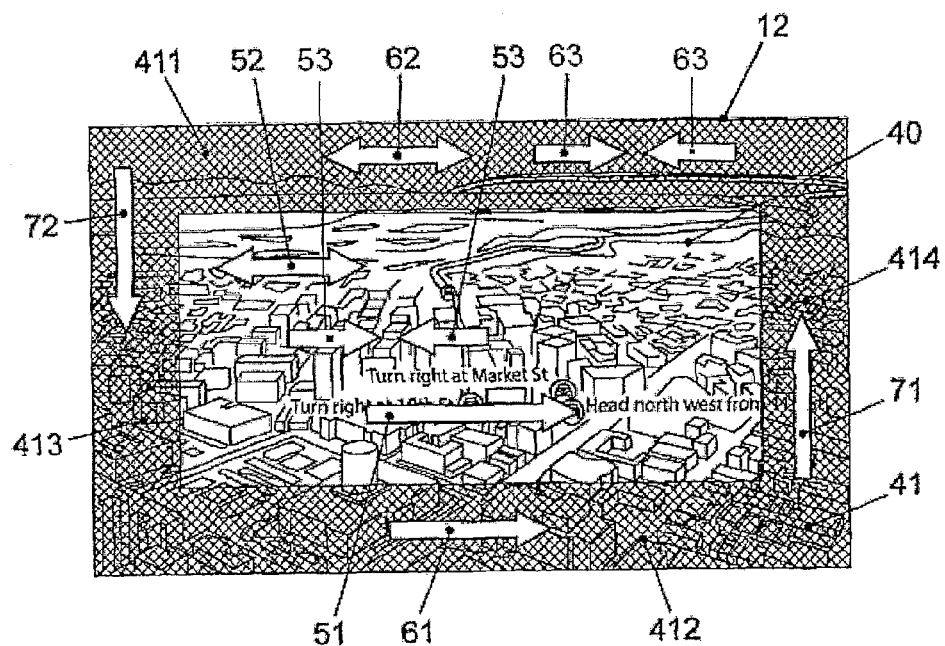
FIG. 6 shows contact-based movements for the operator control of the operator control apparatus shown in FIG. 3.

If a contact-based dragging movement using the multitouchscreen 11 is effected in the inner area 40, as symbolized in FIG. 6 by the arrow denoted by reference symbol 51, then the map presentation 30 is moved in accordance with this movement.

If a contact-based spreading movement using the multitouchscreen 11 is effected in the inner area 40, as symbolized in FIG. 6 by the double-headed arrow denoted by reference symbol 52, then the map presentation 30 is presented in enlarged form in accordance with this spreading movement (reduction of the scale).

If a contact-based compressing movement using the multitouchscreen 11 is effected in the inner area 40, as symbolized in FIG. 6 by the pair of arrows denoted by reference symbol 53, then the map presentation 30 is presented in reduced form in accordance with this movement (enlargement of the scale).

If a contact-based dragging movement using the multitouchscreen 11 is effected in the upper portion 411 or lower portion 412 of the frame 41, as symbolized in FIG. 6 by the arrow denoted by reference symbol 61, then the map presentation 30 is rotated in a manner similar to this movement.

If a contact-based spreading movement using the multitouchscreen 11 is effected in the upper portion 411 or lower portion 412 of the frame 41, as symbolized in FIG. 6 by the double-headed arrow denoted by reference symbol 62, then the map presentation 30 is inclined in the direction of a greater angle of inclination in accordance with this movement.

If a contact-based compressing movement using the multitouchscreen 11 is effected in the upper portion 411 or lower portion 412 of the frame 41, as symbolized in FIG. 6 by the pair of arrows denoted by reference symbol 63, then the map presentation 30 is inclined in the direction of a smaller angle of inclination in accordance with this movement.

If a contact-based dragging movement using the multitouchscreen 11 upwards is effected in the left-hand portion 413 or right-hand portion 414 of the frame 41, as symbolized in FIG. 6 by the arrow denoted by reference symbol 71, then the map presentation 30 is inclined in the direction of a greater angle of inclination in accordance with this movement.

If a contact-based dragging movement using the multitouchscreen 11 downwards is effected in the left-hand portion 413 or right-hand portion 414 of the frame 41, as symbolized in FIG. 6 by the arrow denoted by reference symbol 72, then the map presentation 30 is inclined in the direction of a smaller angle of inclination in accordance with this movement.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A navigation system to determine a route to a destination, comprising:
    a display to present variable information;
    a touch-activated user input device for which user touch coordinates on the input device are directly associated with coordinates of the display;
    a controller to display a map presentation on the display as a first operator control area and to display at least one second operator control area on the display, wherein a contact-based dragging movement using the user input device in connection with coordinates in the first operator control area causes a first function selected from the group consisting of movement of the map presentation,
rotation of the map presentation and
inclination of the map presentation
and wherein a contact-based dragging movement using the user input device in connection with coordinates in the second operator control area causes a second function different from the first function and selected from the group consisting of
movement of the map presentation,
rotation of the map presentation and
inclination of the map presentation,
wherein the second operator control area is oriented horizontally with respect to a horizontally oriented map presentation.

2. The navigation system according to claim 1, wherein the controller presents a third operator control area on the display, wherein a contact-based dragging movement using the user input device in connection with coordinates in the third operator control area causes a third function different from the first and second functions and selected from the group consisting of
movement of the map presentation,
rotation of the map presentation and
inclination of the map presentation.

3. The navigation system according to claim 2, wherein the second operator control area and the third operator control area form a frame surrounding the first operator control area.

4. The navigation system according to claim 3, wherein the second operator control area is associated with a lower portion of the frame and/or with an upper portion of the frame, with respect to a horizontally oriented map presentation.

5. The navigation system according to claim 3, wherein the third operator control area is associated with a left-hand portion of the frame and/or with a right-hand portion of the frame, with respect to a horizontally oriented map presentation.

6. The navigation system according to claim 2, wherein the third operator control area is oriented vertically with respect to a horizontally oriented map presentation.

7. The navigation system according to claim 2, wherein the map presentation is inclined upon a contact-based dragging movement using the user input device in connection with coordinates in the third operator control area.

8. The navigation system according to claim 1, wherein the map presentation is moved upon a contact-based dragging movement using the user input device in connection with coordinates in the first operator control area.

9. The navigation system according to claim 1, wherein the map presentation is rotated upon a contact-based dragging movement using the user input device in connection with coordinates in the second operator control area.

10. The navigation system according to claim 1, wherein
the user input device is a multi-touch device recognizing at least two simultaneously occurring touches,
a contact-based compressing or spreading movement using the multi-touch device in connection with coordinates in the first operator control area causes a fourth function selected from the group consisting of
reduction or enlargement of the map presentation and
inclination of the map presentation
a contact-based compressing or spreading movement using the multi-touch device in connection with coordinates in the second operating control area causes a fifth function different from the fourth function and selected from the group consisting of
reduction or enlargement of the map presentation and
inclination of the map presentation.

11. The navigation system according to claim 1, wherein the navigation system is a vehicle navigation system.

12. The navigation system according to claim 11, wherein display is switchable between navigation system information, climate control information and passenger entertainment information.

13. The navigation system according to claim 1, wherein
when the user input device is not activated, the display shows the map presentation without an indicator for the first and second operator control areas, and
when the user input device is touched, the display adds the indicator for the first and second operator control areas.

14. The navigation system according to claim 1, wherein the user input device is a transparent touchscreen arranged above the display for recognizing the position of a touch on the touchscreen.

15. The navigation system according to claim 1, wherein the user input device is a touchpad arranged independently of the display.

16. A navigation system to determine a route to a destination, comprising:
a display to present variable information;
a multi-touch user input device to recognize at least two simultaneously occurring touches on the user input device such that user touch coordinates on the input device are directly associated with coordinates of the display;
a controller to display a map presentation on the display as a first operator control area and to display at least one second operator control area on the display, wherein a contact-based compressing or spreading movement using the user input device in connection with coordinates in the first operator control area causes a function selected from the group consisting of
reduction or enlargement of the map presentation and
inclination of the map presentation
and wherein a contact-based compressing or spreading movement using the user input device in connection with coordinates in the second operator control area causes the other function selected from the group consisting of
reduction or enlargement of the map presentation and
inclination of the map presentation,
wherein the second operator control area is oriented horizontally with respect to a horizontally oriented map presentation.

17. A method for operating a navigation system for determining a route to a destination, the method comprising:
presenting a map presentation on a display having first and second operator control areas;
receiving a user touch signal on a touch-activated user input device for which user touch coordinates on the input device are directly associated with coordinates of the display;
receiving a contact-based dragging movement at the user input device in connection with the first operator control area and causing a first function selected from the group consisting of
movement of the map presentation,
rotation of the map presentation and
inclination of the map presentation receiving a contact-based dragging movement at the user input device in connection with the second operator control area and causing a second function different from the first function and selected from the group consisting of movement of the map presentation, rotation of the map presentation and inclination of the map presentation, wherein the second operator control area is oriented horizontally with respect to a horizontally oriented map presentation.

18. The method according to claim 17, wherein the display has a third operator control area, and a contact-based dragging movement using the user input device in connection with coordinates in the third operator control area causes a third function different from the first and second functions and selected from the group consisting of movement of the map presentation, rotation of the map presentation and inclination of the map presentation.

19. The method according to claim 17, wherein the user input device is a multi-touch device recognizing at least two simultaneously occurring touches, a contact-based compressing or spreading movement using the multi-touch device in connection with coordinates in the first operator control area causes a fourth function selected from the group consisting of reduction or enlargement of the map presentation and inclination of the map presentation a contact-based compressing or spreading movement using the multi-touch device in connection with coordinates in the second operating control area causes a fifth function different from the fourth function and selected from the group consisting of reduction or enlargement of the map presentation and inclination of the map presentation.

\* \* \* \* \*